(12) United States Patent
Zhang et al.

(10) Patent No.: US 8,551,201 B2
(45) Date of Patent: Oct. 8, 2013

(54) POLYURETHANE COMPOSITION FOR CMP PADS AND METHOD OF MANUFACTURING SAME

(75) Inventors: Yong Zhang, Carmel, IN (US); David Huang, Westfield, IN (US); Lu Sun, Indianapolis, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 189 days.

(21) Appl. No.: 12/537,862

(22) Filed: Aug. 7, 2009

(65) Prior Publication Data

US 2011/0034578 A1 Feb. 10, 2011

(51) Int. Cl.
*B24B 1/00* (2006.01)
*B24D 3/00* (2006.01)
*C08G 18/00* (2006.01)
*C08G 18/70* (2006.01)

(52) U.S. Cl.
USPC ............ 51/296; 521/159; 521/170; 521/172; 521/174; 528/67

(58) Field of Classification Search
USPC ........ 521/159, 170, 172, 174; 528/67; 51/296
See application file for complete search history.

(56) References Cited

U.S. PATENT DOCUMENTS

| | | | |
|---|---|---|---|
| 3,094,495 A * | 6/1963 | Gemeinhardt | 521/159 |
| 4,980,386 A | 12/1990 | Tiao et al. | |
| 5,545,706 A | 8/1996 | Barksby et al. | |
| 6,095,902 A | 8/2000 | Reinhardt | |
| 6,184,262 B1 * | 2/2001 | Suhoza et al. | 521/90 |
| 6,514,301 B1 | 2/2003 | Lombardo | |
| 6,723,771 B2 | 4/2004 | Palinkas et al. | |
| 6,866,743 B2 * | 3/2005 | Paulsen et al. | 156/331.4 |
| 7,074,115 B2 | 7/2006 | James et al. | |
| 7,169,030 B1 | 1/2007 | Kulp | |
| 7,291,063 B2 * | 11/2007 | Swisher et al. | 451/533 |
| 7,371,160 B1 * | 5/2008 | Cruz et al. | 451/526 |
| 7,414,080 B2 | 8/2008 | Kulp | |
| 7,534,163 B2 | 5/2009 | Vangsness et al. | |
| 2004/0157985 A1 * | 8/2004 | Masui et al. | 524/589 |
| 2005/0079806 A1 | 4/2005 | James et al. | |
| 2005/0171225 A1 | 8/2005 | Kulp | |
| 2007/0213497 A1 | 9/2007 | Nagaraj et al. | |
| 2008/0242755 A1 | 10/2008 | Kulp | |
| 2009/0062414 A1 | 3/2009 | Huang et al. | |
| 2009/0093201 A1 | 4/2009 | Kazuno et al. | |
| 2010/0015893 A1 * | 1/2010 | Kazuno et al. | 451/41 |

FOREIGN PATENT DOCUMENTS

WO WO 2008/026488 A1 3/2008
WO WO 2009/067393 A1 5/2009

* cited by examiner

*Primary Examiner* — Melissa Rioja
(74) *Attorney, Agent, or Firm* — Nilay S. Dalal; Iurie A. Schwartz

(57) ABSTRACT

Polyurethane composition based on a certain polyether and polyester prepolymer reaction mixture, wherein the composition is utilized in manufacturing chemical mechanical polishing/planarizing (CMP) pads. The CMP pads have low rebound and can dissipate irregular energy as well as stabilize polishing to yield improved uniformity and less dishing of the substrate.

21 Claims, 4 Drawing Sheets

POLYURETHANE COMPOSITION FOR CMP PADS AND METHOD OF MANUFACTURING SAME

FIELD OF THE INVENTION

The present invention relates to chemical mechanical polishing/planarization pads based on a novel composition, and method for manufacturing same. Specifically, the CMP pads are polyurethane pads derived from a polyether/polyester prepolymer reaction mixture, wherein the resulting pads exhibit a moderate hardness with high porosity, a high tear resistance and high damping performance.

BACKGROUND OF THE INVENTION

Chemical mechanical planarization, also known as chemical mechanical polishing or CMP, is a technique used to planarize the top surface of an in-process semiconductor wafer or other substrates, such as optical, magnetic type of substrates in preparation of subsequent steps or for selectively removing material. The technique employs a slurry that can have corrosive and abrasive properties in conjunction with a polishing pad.

The rapid advances in semiconductor technology has seen the advent of very large scale integration (VLSI) and ultra large scale integration (ULSI) circuits resulting in the packing of many more devices in smaller area in areas in a semiconductor substrate. The greater device densities require a great degree of both polish and planarity to permit the higher resolution lithographic processes required to form the greater number of devices having smaller feature incorporated in current designs. Moreover, copper, because of its low resistance is increasingly being used as interconnects. Conventionally, etching techniques are used to planarize conductive (metal) and insulator surfaces. However, certain metals, desirable for their advantageous properties when used as interconnect (Au, Ag, Cu) are not readily amenable to etching, thus the need for CMP processes.

Typically, CMP is a dynamic process involving cyclic motion of both the polishing pad and the workpiece. CMP combines the chemical conversion of the surface layer removed, wit the mechanical removal of the conversion product. Ideally, the conversion product is soft, facilitating high polishing rates. An advantage of the soft polishing pad is low defect density of the polished wafer and good within-wafer uniformity. However, soft CMP pads suffer from a short pad life requiring replacement after about 50 wafers. Further, during the polishing cycle energy is transmitted to the pad. A portion of this energy is dissipated inside the pad as heat, and the remaining portion is stored in the pad and subsequently released as elastic energy during the polishing cycle. The latter is believed to contribute to the phenomenon of dishing of metal features and oxide erosion. While it is generally, known that prevention of dishing requires a stiffer pad, this type of pad increases the number and density of surface scratches and defects.

Therefore, a need continues to exist for CMP pads that provide good removal rates, good within wafer (WIW) and within die (WID) uniformities, low dishing and/or erosion, reduced scratching, lower conditioning requirements and prolonged pad life.

SUMMARY OF THE INVENTION

The invention relates, in part, to CMP pad chemistry formulation that has special properties, in particular a high damping performance. Choices in starting materials and specific combinations of materials, together with processes such as gas frothing have been found to affect the morphology of the polymeric material, resulting in a final product that has unique properties and is particularly advantageous in CMP pads.

It has been found that CMP pads with low rebound tend to absorb relatively high amounts of energy during cyclic deformation, causing less dishing during polishing and yielding better WID uniformity. Stiffness is likewise an important consideration for WID uniformity and prolonged pad life. One attempt to describe damping effects quantitatively has used a parameter named Energy Loss Factor (KEL). KEL is defined as the energy per unit volume lost in each deformation cycle. Generally, the higher the value of KEL for a pad, the lower the elastic rebound and the lower the observed dishing.

To increase the KEL value, the pad can be made softer. However, this approach tends to also reduce the stiffness of the pad. The reduced stiffness results in decreased planarization efficiency and increases dishing due to conformation of the pad around the device corner.

Another approach for increasing the KEL value of the pad is to alter its physical composition in such a way that KEL is increased without reducing stiffness. In an attempt to attain the right balance, it has been found that a formulation of co-cured polyether and polyester prepolymers in a particular weight percentage provides a polyurethane chemical polishing pad with high damping properties, low rebound and dishing. Specifically, in a preferred embodiment of this invention, the polyurethane material is a reaction mixture of a polyether prepolymer in an amount of about 60-80 weight percent (wt %) with a polyester prepolymer in an amount of 20-40 wt %. Naturally, the microcellular pad formulation includes surfactants, frothing agents, curatives, and optionally other additives, such as fillers. Thus, the polyurethane microcellular the CMP pads of the preferred composition exhibit a high damping performance, while retaining moderated hardness with high porosity and high tear resistance.

The invention addresses demands placed on CMP pads used in the manufacture of traditional and advanced electronic, optical or magnetic components and has many advantages. The highly damping polymeric material of the invention has high energy dissipation and can absorb irregular bouncing and oscillating energy at the polishing interface to yield better uniformity. CMP pads manufactured from this material provide good WIW and WID uniformities, smooth polishing performance, low dishing and/or erosion. The pads generally have a high degree of stable hardness or stiffness, providing good planarization performance and long pad life.

In one aspect of the invention, polyurethane chemical mechanical polishing pad derived from a polyether/polyester based prepolymer reaction mixture is provided. The pad includes a toluene diisocyanate (TDI)-terminated polytetramethylene ether glycol based prepolymer in an amount of about 60-80 wt % based on the total weight of prepolymer mixture; toluene diisocyanate (TDI)-terminated ethylene adipate polyester prepolymer in an amount of about 20-40 wt %, wherein the weight percent based on the total weight of prepolymer mixture; an effective amount of surfactant and curative, respectively, and a foaming agent introduced into the reaction mixture to form the polishing pad, wherein the resulting polishing pad has a density ranging from about 0.6 to about 0.95 g/cc.

In another aspect of the invention, a method of manufacturing a polyurethane CMP pad derived from a polyether/polyester based prepolymer reaction mixture is provided. The method includes mixing toluene diisocyanate (TDI)-terminated polyether prepolymer in an amount of about 60-80 wt % with toluene diisocyanate (TDI)-terminated polyester prepolymer in an amount of about 20-40 wt %, in the presence of an effective amount of surfactant, wherein the weight percent is based on the total weight of the prepolymers; frothing the reaction mixture by introducing a foaming agent into the reaction mixture; and polymerizing the frothed reaction mixture in the presence of an effective amount of curative to form a polishing pad having a density ranging from about 0.6 to about 0.95 g/cc.

Advantageously, the CMP pad can be prepared utilizing prepolymers that are commercially available, thus enabling and simplifying the overall fabrication process. Aspects of gas frothing and casting can be carried out using standard techniques or equipment. In certain chemistry formulations of the pad, frothing time can be decreased without sacrificing foaming characteristics and quality.

BRIEF DESCRIPTION OF THE FIGURES

The objects and advantages of the invention will be better understood from the following detailed description of the preferred embodiments thereof in connection with the accompanying figures wherein.

DETAILED DESCRIPTION OF THE INVENTION

Figure 1:
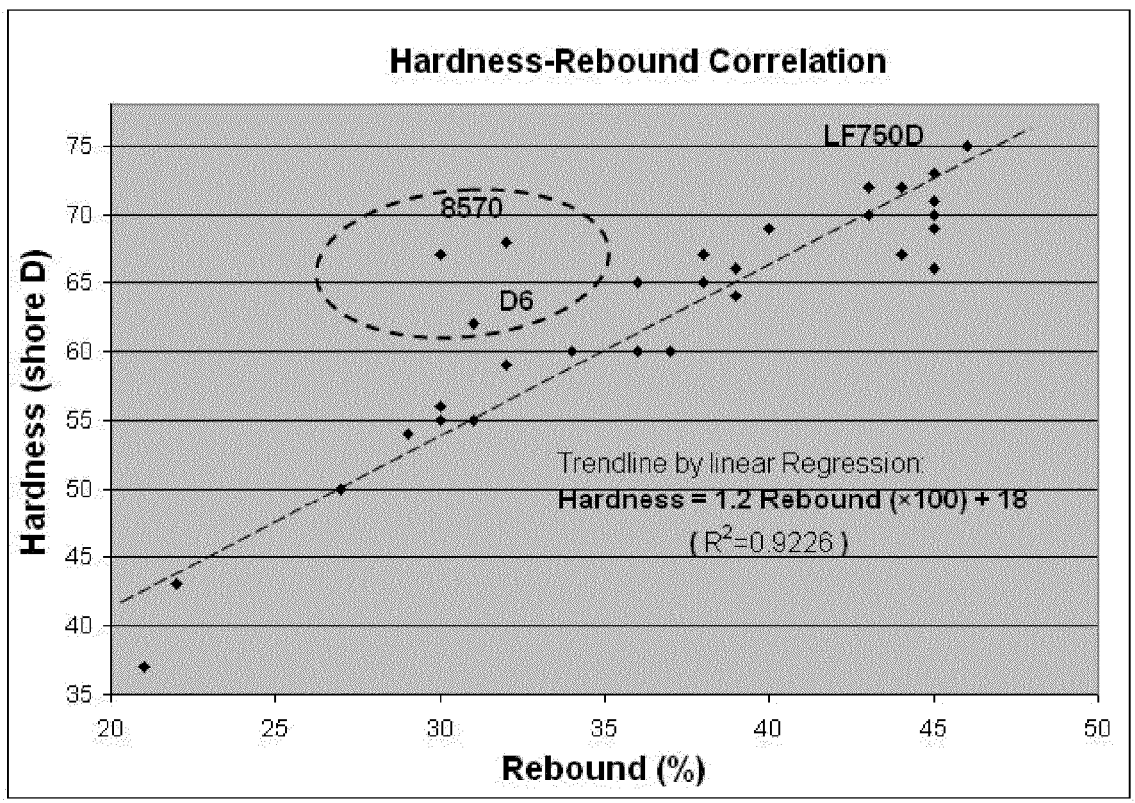
FIG. 1 illustrates the hardness-rebound correlation of the solid polyether and polyester prepolymers prepared and tested.

The above and other features of the invention including various details of construction and combinations of parts, and other advantages, will now be more particularly described with reference to the accompanying drawings and pointed out in the claims. It will be understood that the particular polyurethane chemical mechanical polishing pad and method of manufacturing embodying the invention are shown by way of illustration and not as a limitation of the invention. The principles and features of this invention may be employed in various and numerous embodiments without departing from the scope of the invention.

In one aspect, the invention relates to a damping polymeric material that is particularly well suited in the manufacture of CMP pads. As used herein, the term "damping" refers to the ability of a material to absorb mechanical energy. Preferably damping is measured by the Bashore rebound method, a simple technique for testing the rebound of a material. The Bashore rebound test is known in the art and is described, for instance, in the American Society for Testing and Materials (ASTM) Standard D-2632. Other methods for measuring rebound also can be used, as known in the art.

The polymeric material is a polyurethane, i.e., a polymer containing repeating urethane units. The polyurethane is derived from a polyether/polyester based prepolymer reaction mixture wherein the mixture is cross-linked with a curative. The polymeric material can include other ingredients, e.g., surfactants, fillers, catalysts, processing aids, additives, antioxidants, stabilizers, lubricants and so forth.

Urethane prepolymers are products formed by reacting polyols, e.g., polyether and/or polyester polyols, and difunctional or polyfunctional isocyanates. As used herein, the term "polyol" includes diols, polyols, polyol-diols, copolymers and mixtures thereof.

Polyether polyols can be made through alkylene oxide polymerization and tend to be high molecular weight polymers, offering a wide range of viscosity and other properties. Common examples of ether-based polyols include polytetramethylene ether glycol (PTMEG), polypropylene ether glycol (PPG), and so forth.

Examples of polyester polyols include polyadipate diols, polycaprolactone, and others. The polyadipate diols can be made by the condensation reaction of adipic acid and aliphatic diols such as ethylene glycol, propylene glycol, 1,4-butanediol, neopentyl glycol, 1,6-hexanediol, diethylene glycol and mixtures thereof.

Polyol mixtures can also be utilized. For instance, polyols such as those described above can be mixed with low molecular weight polyols, e.g., ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol and mixtures thereof.

The most common isocyanates utilized in preparing urethane prepolymers are methylene diphenyl diisocyanate (MDI) and toluene diisocyanate (TDI), both aromatic. Other aromatic isocyanates include para-phenylene diisocyanate (PPDI), as well as mixtures of aromatic isocycnates.

In specific aspects of the invention, the urethane prepolymers employed can include aliphatic isocyanates such as, for instance, hydrogenated MDI (H12MDI), hexamethylene diisocyanate (HDI), isophorone diisocyanate (IPDI), other aliphatic isocyanates and combinations thereof. Thus, the prepolymers also can include mixtures of aliphatic and aromatic isocyanates.

Prepolymers are often characterized by the weight percent (wt %) of unreacted isocyanate groups (NCO) present in the prepolymer. Wt % NCO can be used to determining mixing ratios of components for producing polyurethane materials. In a preferred embodiment, the amount of unreacted NCO ranges from about 6.5 to about 8.5 wt % and preferably from about 7.6 to about 8.4 wt %.

Urethane prepolymers can be formed using synthetic techniques known in the art. In many cases, suitable urethane prepolymers are commercially available.

Examples of commercially available polyether urethane prepolymers include some Adiprene® polyether prepolymers, from Chemtura Corporation, Middletown, Conn., some Airthane® prepolymers, from Air Products and Chemicals, Inc., Allentown, Pa., and others. In many cases, these prepolymers contain low levels of free monomer, e.g., TDI monomer, and are referred to as "low free" or "LF".

Specific examples of polyether urethane prepolymers include, for instance, those designated as Adiprene® LF 750D (a TDI-PTMEG prepolymer, LF, having a NCO of 8.79 wt %), L 325 (TDI/H12MDI-PTMEG prepolymer, having a NCO of 9.11 wt %), LFG 740D (TDI-PPG prepolymer, LF, having a NCO of 8.75 wt %), LW 570 (H12MDI-polyether prepolymer, having a NCO of 7.74 wt %), LFH 120 (HDI-polyether prepolymer, LF, having a NCO of 12.11 wt %) and Airthane® PHP-80D (TDI-PTMEG prepolymer, LF, having a NCO of 11.1 wt %). Other specific examples of urethane prepolymers that are commercially available include Andur® (Anderson Development Company), Baytec® (Bayer Material Science) and so forth.

Examples of polyester urethane prepolymers include, for instance, a TDI terminated ethylene adipate polyester urethane prepolymer designated as Vibrathane® 8570, having a NCO of 6.97 wt %, from Chemtura Corporation, Middletown, Conn. Other suitable polyester urethane prepolymers include but are not limited to Versathane® D-6, having a NCO of 5.99 wt % or D-7, having a NCO of 6.60 wt %, from Air Products and Chemicals. More specifically, the TDI-terminated ethylene adipate polyester has a molecular weight ranging from about 2500 to 4000 and is based on a reaction of an ethylene adipate polyol with a 1,3-diisocyanato methylbenzene.

As discussed is detail below, it has been found that a CMP pad derived from a polyether/polyester based prepolymer reactive mixture, wherein the co-polymerized/reacted blend is provided in an amount of about 60-80 wt % polyether to about 20-40 wt % polyester, unexpectedly provides a pad material which has the physical properties of high damping, low rebound, and good removal rate. In particular, the polyether prepolymer, selected from the family of toluene diisocyanate (TDI)—terminated polytertamethylene ether glycol imparts high hardness and hydrolysis stability, while the polyester prepolymer from the family of toluene diisocyanate (TDI)—terminated ethylene adipate polyester imparts soft segments, and high damping. This balance of physical properties in turn provide within wafer and within die uniformity, low dishing and/or erosion, reduced scratching of the wafer, and low conditioning requirements. Preferably, the co-polymerized blend is provided in an amount of about 65-75 wt % polyether to about 25-35 wt % polyester and most preferred about 70 wt % polyether to about 30 wt % polyester.

The curative is a compound or mixture of compounds used to cure or harden the urethane prepolymers. The curative reacts with isocyanate groups, linking together chains of prepolymer to form a polyurethane. Common curatives typically employed can include 4,4'-methylene-bis(2-chloroaniline) methylene, abbreviated as MBCA and often referred to by the tradename of MOCA®; 4,4'-methylene-bis-(3-chloro-2,6-diethylaniline), abbreviated as MCDEA; dimethylthiotoluenediamine, trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate; 1,2-bis(2-aminophenylthio)ethane; 4,4'-methylene-bis-aniline; diethyltoluenediamine; 5-tert-butyl-2,4- and 3-tert-butyl-2,6-toluenediamine; 5-tert-amyl-2,4- and 3-tert-amyl-2,6-toluenediamine and chlorotoluenediamine and others.

In specific aspects of the invention, the curative employed includes an aromatic amine, in particular an aromatic diamine, e.g., bis-(alkylthio) aromatic diamines. Commercial examples of suitable aromatic diamines include Ethacure® 300 (from the Albermarle Corporation, Richmond, Va.), which is a mixture containing 3,5-bis(methylthio)-2,6-toluenediamine and 3,5-bis(methylthio)-2,4-toluenediamine; and Ethacure® 100 (also from Albermarle Corporation) which is a mixture containing 3,5-diethyltoluene-2,4-diamine and 3,5-diethyltoluene-2,6-diamine.

In addition to the aromatic diamine component, preferred curatives can include one or more other ingredients. For instance, to modify the urethane domain network or polymer structure, polymer cross-linking density is increased by introducing tri-functional agents. Preferred examples of trifunctional agents include triols, for instance aliphatic triols such as trimethanolpropane (TMP), alkoxylated aliphatic triols, e.g. ethoxylated TMP, such as TP30, available from Perstorp Corp., polypropylene ether triol having, for instance, a molecular weight of 100-900 and aliphatic amino triols such as Vibracure® A931, available from Chemtura, triethanol amine (TEA), and others. Mixtures of triols can likewise be employed.

In certain embodiments, the preferred curative for use with polyether urethane prepolymers is a mixture of Ethacure® 300 in combination with 5-10 wt % triol, and in particular the combination of Ethacure 300 with 5%-30% trimethanolpropane (TMP).

The relative amounts of urethane prepolymers and curative can be determined, for instance, by taking into account the % NCO of the given urethane prepolymer. The curative can be added to give a combination of amine and hydroxyl groups at about, e.g., 0.9 to 1.05 (i.e., 90 to 105%), of the available isocyanate groups in the prepolymers on an equivalent basis. In a preferred embodiment, the curative is in a ratio of 0.9 to 1.0 of the prepolymers used.

For CMP applications the damping material preferably is microcellular, containing microscopic sized voids which typically are formed by processes targeted at incorporating such voids into the structure of the material. During CMP planarization, the voids or micropores retain slurry for polishing the surface of the workpiece.

Several approaches can be used to impart microstructure to the polyurethane material. Porosity can be formed, for instance, by using filler particles such as hollow polymeric microspheres, filled with fluid (gas or liquid). Microstructure can also be imparted by frothing gas into a viscous system, injecting gas into the polyurethane melt, introducing gas in situ through a chemical reaction giving rise to gaseous product, decreasing pressure to cause dissolved gas to form bubbles or by other methods.

In specific examples of the invention, at least a portion of the void volume is formed by frothing with a gas such as nitrogen, dry air, carbon dioxide, rare gases, e.g., helium, argon, xenon, as well as other gases or gas mixtures. Gases that do not cause chemical reactions such as oxidation reactions in the foam are preferred and are referred to herein as "non-reactive" or "inert" gases. Particularly preferred is nitrogen.

Frothing is described, for instance, in U.S. Pat. No. 6,514,301B, issued to Brian Lombardo on Feb. 4, 2003, the teachings of which are incorporated herein by reference in their entirety. Preferably, frothing produces microstructures with adjustable pore size and distribution. In one example, the microcellular polyurethane material has pores greater than about 30 μm. Frothing the prepolymer can be conducted in the presence of one or more surfactant(s), e.g., non-ionic or ionic surfactant(s). Including a surfactant can be particularly beneficial in systems having low viscosity.

A stable froth (foam) is preferred in creating microstructure in polyurethane materials and is believed to result, at least in part, from the adsorption and partition of hydrophobic hydrocarbon chains of surfactant at the air/polymer interface and reaction of its functional group with the polymer. In creating the foam, a surfactant is desirable to produce the polyurethane froth. Froths that are stable and maintain their integrity when subjected to varying processing conditions, e.g., shear, temperature or pressure variations, typically employed during processing also are preferred. It was also found that surfactant selection could affect not only frothing intensity or froth stability but also pore size, an important parameter for polymeric materials used to manufacture CMP pads.

Examples of suitable surfactants include silicone surfactants such as, for instance, copolymers containing at least one block comprising polydimethylsiloxane and at least one other block comprising polyether, polyester, polyamide, or polycarbonate segments.

In specific embodiments, the surfactant is a polysiloxane-polyalkyleneoxide (or polysiloxane-polyalkylene oxide) surfactant. Polysiloxane-polyalkyleneoxide surfactants also are known in the art as a silicone copolyols and can include polymeric, oligomeric, copolymeric and other multiple monomeric siloxane materials.

Polysiloxane-polyalkyleneoxide surfactants can be copolymers that comprise a polysiloxane backbone comprised of siloxane units, and polyalkyleneoxide sidechains. The polysiloxane backbone can be either straight chain, branched chain or cyclic in structure. The polyalkyleneoxide sidechain of copolymers may include polyethyleneoxide, polypropyleneoxide, polybutyleneoxide macromonomers and so forth, or mixtures thereof. Optionally, the side chains may also include polyethylene, polypropylene, polybutylene monomers. The polyalkyleneoxide monomer can be present in an amount greater than about 10%, preferably greater than about 20%, and more preferably greater than about 30% by weight of the copolymer.

Polyethyleneoxide sidechain macromonomers are preferred. Also, preferred are polypropyleneoxide sidechains, and sidechains comprising polyethyleneoxide and polypropylene oxide at a mole ratio of from about 1:2 to about 2:1.

Examples of commercially available surfactants that can be used are some available from Momentive Performance Materials under the designation of Niax®, for instance L-7500, L-5614, L-1580; from Air Products and Chemicals, e.g., under the designation of DC-193, DC-5604 and DC-5164; and from Dow Corning Corporation, Midland, Mich., e.g., under the designation DC-309, 5098EU and Q2-5211 (a methyl(propylhydroxide, ethoxylated)bis(trimethylsiloxy)silane).

The surfactant preferably is selected based on parameters such as foaming capability, stability or cell size obtained during frothing. In particular, for a polyether/polyester urethane prepolymer mixture, a suitable surfactant is Niax® L-5340, available from Momentive Performance Materials, which imparts chemical stability and compatibility in both TDI polyether and polyester components, as well as provides fine, uniform cell with a high degree of closed cells by preventing cell coalescence even in lower in-place densities.

Amounts of surfactant can be determined experimentally, for instance by evaluating frothing characteristics and/or properties of the end product. Typically, surfactant levels are within the range of from about 0.3 to about 5% by weight with respect to the total weight of prepolymers and surfactant. Surfactant amounts also can be expressed as parts per hundred parts of resin (PHR). In many cases, a suitable surfactant amount was around 1.5 PHR. Other amounts can be selected.

The system used for forming the polymeric material optionally can include other ingredients, such as catalysts, fillers, processing aids, e.g., mold release agents, additives, colorants, dyes, antioxidants, stabilizers, lubricants and so forth.

Catalysts, for instance, are compounds that are added, typically in small amounts accelerate a chemical reaction without being consumed in the process. Suitable catalysts that can be used to produce polyurethane from prepolymers include amines and in particular tertiary amines, organic acids, organometallic compounds such as dibutyltin dilaurate (DBTDL), stannous octoate and others.

As known in the art, fillers can be added to affect polishing properties of a CMP pad, e.g., material removal rates, to promote porosity or for other reasons. Specific examples of fillers that can be utilized include but are not limited to particulate materials, e.g., fibers, hollow polymeric microspheres, functional fillers, nanoparticles and so forth.

The present invention also relates to preparing a damping microcellular polyurethane material. In a preferred process, a polyether and polyester prepolymers are preferably combined with a surfactant and frothed to produce a froth which in turn is combined with a curative. One or more optional ingredient(s) e.g., catalysts, fillers, processing aids, additives, dyes, antioxidants, stabilizers, lubricants and so forth can be added to or can be present in the prepolymer reaction mixture, curative or surfactant. One or more such ingredients also can be added during frothing or to the resulting foam.

Frothing can be conducted with nitrogen or another suitable gas, using equipment such as commercial casters with pressurized or non-pressurized tanks and distribution system or other mixing systems. Typical frothing temperatures can be within the range of from about 50 to about 230° F. e.g., 130 to about 185° F.; frothing time can be within the range of from about 10 seconds to about 240 minutes; gas, e.g., nitrogen, flow can be within the range of from about 0.2 to about 20 standard cubic feet per hour; mixing speed can be within the range of from about 500 to about 5000 rotations per minute (RPM).

The pot or mixer tank can be maintained at ambient conditions or under pressure, e.g., up to about 10 atmospheres. The froth cast and cured in the presence of the curative to produce the polyurethane material.

Casting of the foam is conducted by pouring the foam into a mold, for instance a mold suitable for producing a desired CMP pad. Mold dimensions and shapes useful in manufacturing CMP pads are known in the art. The froth is cured or hardened to produce a microcellular polyurethane material. This curing step can be carried out in an oven, e.g., a box oven, convey oven or another suitable oven, at a suitable curing temperature and for a suitable period of time. Systems such as described above can be cured at a temperature in the range of from about 50 to about 250° F. e.g., 235° F., for a period of time of about 30 minutes. The curing process and its end point can be determined by evaluating the viscosity and hardness of the system. Curing can be conducted in air or under special atmospheres, e.g., nitrogen, or another suitable gas or gas mixture.

After it is determined that curing is completed, for instance at the point when the system in the mold can no longer be poured, the hardened microcellular product is released from the mold and can be post-cured in an oven at a suitable temperature and for a suitable period of time. For instance the hardened product can be post-cured at a temperature within the range of from about 200 to about 250° F., e.g., 235° F., for several hours, e.g., 8-16. Following post-curing, the microcellular product can be further conditioned at room temperature for a period of several hours to a day or longer.

The microcellular polyurethane CMP pad derived from a polyether/polyester mix in the requisite proportions preferably has a Bashore rebound within the range of from about 20% to about 50%, preferably, about 30% to 38%. The pad material can have a density within the range of from about 0.6 to about 1.0 g/cm$^3$, preferably within the range of from about 0.60 to about 0.95, while in some embodiments, the hardness of the microcellular polymeric material utilized in the pad is in the range of from about 30 to about 80 D.

Cell size, also referred to as "pore" size preferably is uniform throughout the material. Mean pore size can be in the rage of from about 2 microns (μm) to about 200 μm. In some specific instances, the mean pore size is greater than about 30 microns (μm), for example within the range of from about 50 to about 100 μm and larger, e.g., up to about 120 μm and higher.

Without wishing to be held to a particular theory or mechanism, it is believed that frothing with a non-reactive gas, e.g., nitrogen or another inert gas, in the presence of surfactant affects pore distribution and size during foaming. During frothing, the surfactant appears to control pore size and distributions by controlling surface tension at the air/liquid interface.

CMP pads manufactured using a system and method such as described above can be used in planarizing or polishing semiconductor, optical, magnetic or other substrates. However, the polyurethane material derived from the polyether/polyester prepolymer reaction mixture is determined from the high damping property. One way of characterizing the damping, is the Bashore rebound which is preferably measured using a solid product obtained by combining a single urethane prepolymer or prepolymer mixtures and a curative under polymerization conditions, e.g., suitable temperatures and time periods to cure or harden the combination into a solid product. Generally, the solid product is formed without subjecting the prepolymer to a process intended to introduce microscopic sized voids into the material, for example in the absence of frothing, further discussed below.

The solid product is employed to screen candidate systems with respect to other properties such as hardness and rebound (as an expression of damping). In accordance, with the one aspect of the present invention, a number of ether and ester prepolymers were cured as solid products. The solid products were tested and the results for rebound and hardness tabulated in Table 1, below.

mer, LF, having a NCO of 8.79 wt %); Andure 70 and 75 (TDI-PTMEG prepolymers from Anderson Development Company, having a NCO of 8.3 wt % and 9.0 wt %); L 325 (TDI/H12MDI-PTMEG prepolymer, having a NCO of 9.11 wt %); LFG 740D (TDI-PPG prepolymer, LF, having a NCO of 8.75 wt %); Vibrathane® 8570 and Verathane® D-6 (TDI-terminated polyester-based prepolymers, having a NCO of 6.95-7.25 wt % and 5.7-6.1 wt %, respectively); and LFH 120 (HDI-polyether prepolymer, LF, having a NCO of 12.11 wt %); Rencast 6430 and 6444 from Hunstman Corporation; Freeman 1070 A & B from Freeman Manufactory & Supply Company; and RN-1526 (a HMDI-TDI polyether prepolymer, having a NCO of 9.17 wt %) from Cytec Industries.

Several curatives were evaluated for each of the polyurethane prepolymers identified in Table 1. The curative tested included a commercially aromatic diamine identified herein as Ethacure® 300 (from Albermarle Corporation) identified herein as E300, Ethacure® 100 (from Albermarle Corporation), identified herein as E100; and several mixtures of aromatic diamines and triols, wherein TMP is trimethanolpropane. Alternatively, the L-TMP is a liquid ethoxylated TMP at room temperature, which can replace solid TMP; or Vibracure® A157 [chemical name: 1,3 Propanediol bis-(4-aminobenzoate)] a high-purity aromatic diamine curative from Chemtura Corporation. Percentages are weight percentages.

Specifically, Table 1 lists material systems that were studied, where each system corresponds to a combination of a specific urethane prepolymer and a specific curative. The solid product obtained by combining, under polymerization conditions, the specific prepolymer with the specific curative in each system was evaluated with respect to hardness and Bashore rebound. Naturally, each one of these systems could

TABLE 1

| Rebound % | Hardness Shore D | Prepolymer Name | Curative Name | Notes for Prepolymer |
|---|---|---|---|---|
| 44 | 72 | LF750D | E300 | TDI-Polyether |
| 43 | 70 | LFG740D | E300 | TDI-Polyether |
| 38 | 65 | LFG740D | E300 + 30% TMP | TDI-Polyether |
| 40 | 69 | LFG740D | E300 + 15% L-TMP | TDI-Polyether |
| 38 | 67 | LFG740D | E300 + 15% L-TMP | TDI-Polyether |
| 45 | 70 | Andure70 | E300 | TDI-Polyether |
| 21 | 37 | Andure70 | Polyol | TDI-Polyether |
| 45 | 71 | Andure75 | E300 | TDI-Polyether |
| 43 | 70 | Andure75 | E300 + 10% TMP | TDI-Polyether |
| 44 | 67 | Andure75 | E300 + 30% TMP | TDI-Polyether |
| 45 | 69 | RN-1526 | E-300 | TDI-HMDI-Polyether |
| 39 | 64 | RN-1526 | E300 + 15% L-TMP | TDI-HMDI-Polyether |
| 37 | 60 | RN-1526 | E300 + 30% L-TMP | TDI-HMDI-Polyether |
| 43 | 72 | L325 | E300 | TDI-HMDI-Polyether |
| 45 | 73 | Freeman1070A | Freeman1070B | TDI-Polyether |
| 39 | 66 | LFH120 | E300 | HDI-Polyether |
| 32 | 59 | LFH120 | E300 + 5% TMP | HDI-Polyether |
| 30 | 55 | LFH120 | E300 + 10% TMP | HDI-Polyether |
| 22 | 43 | LFH120 | E300 + 30% TMP | HDI-Polyether |
| 34 | 60 | LFH120 | E300 + 5% L-TMP | HDI-Polyether |
| 29 | 54 | LFH120 | E300 + 15% L-TMP | HDI-Polyether |
| 30 | 56 | LFH120 | E300 + 5% A157 | HDI-Polyether |
| 27 | 50 | LF1930A | E300 | TDI-Polyester |
| 36 | 60 | Rencast6444 | E300 | HMDI-Polyether |
| 45 | 66 | Rencast6444 | E100 | HMDI-Polyether |
| 36 | 65 | V23.705 | E300 | MDI-Polyether |
| 31 | 55 | V23.705 | Diol + polyol | MDI-Polyether |
| 46 | 75 | Rencast6430 | Ren 6430 | MDI-Polyester |
| 31 | 62 | D6 | E300 | TDI-Polyester |
| 32 | 68 | 8570 | E300 | TDI-Polyester |
| 30 | 67 | 8570 | E300 + 5% A157 | TDI-Polyester |

The urethane prepolymers employed in the screening experiment shown in Table 1 were obtained commercially, and included: Adiprene® LF 750D (a TDI-PTMEG prepolymer have been fabricated into a urethane based polishing pad material through the methods discussed above, where the urethane is turned into a foam via inert gas or microspheres to attain the appropriate foam porosity. Moreover, other properties can be studied and compared using a solid product formed by combining a urethane prepolymer and a curative under polymerization conditions (e.g., the ability to form froth and mixing, chemical stability of the product vis-á-vis slurries employed in CMP processing, viscosity of the system, release of free monomer, e.g., TDI, during processing, pot life, color, etc.).

Preferred prepolymer-curative combinations polymerize forming a solid product have a rebound less than about 38%, as measured by the Bashore rebound test. Highly damping solid products, e.g., having a rebound lower than 35%, were obtained from systems that include a TDI terminated ethylene adipate polyester prepolymers and a curative that is Ethacure® 300.

In preferred examples, the solid products have a hardness in the range of from about 30 D to about 85 D, e.g., from 55 D to 80 D. The Shore D scale, utilizing Durometer testing, is a well known approach for defining hardness of polymeric materials and generally is applied to plastics harder than those measured on the Shore A scale. The Shore D hardness was measured according to ASTM D 2240. Thus, based on the solid products screened in Table 1, from among the polyether based prepolymers it has been found that the TDI-polyether prepolymer (toluene diisocyanate (TDI)-terminated polytetramethylene ether glycol (Adiprene® LF 750D)) provides hydrolytic stability, a high degree of hardness (72), but a relatively high rebound (44).

On the other hand, the solid material based on polyester prepolymers, such as the toluene diisocyanate (TDI)-terminated ethylene adipated material (Versathane® D6 or Vibrathane® 8570) provides a high degree of hardness (ranging from about 62-67), but more importantly, a low rebound/high damping (below 38 Bashore). Illustrated in a different manner, and as shown in FIG. 1 the hardness-rebound correlation of the different material screened is shown. With the rebound on the X-axis and hardness on the Y-axis, the linear regression of the data for the various reaction mixtures (or solid material systems) is obtained, which means normally high hardness couples with a high rebound and low hardness couples with a low rebound. The polyether prepolymer identified as LF 750D, has both a high hardness, and a relatively high rebound, as compared to the other materials tested. The high hardness is necessary to impart to the ultimate pad material the structural rigidity requisite for polishing, planarizing and removal of imperfections from the surface of the substrate.

A good solid material derived from prepolymer/curative formulated into a hard damping pad should be abnormally above the trend line significantly, which is a region where high hardness couples with low rebound. As indicated in FIG. 1, the solid materials derived from certain moderately hard polyester based prepolymers, (i.e., Versathane® D6 or Vibrathane® 8570) exhibited high damping or low rebound. These properties are important in the ultimate pad material, as they tend to absorb high amounts of energy during cyclic deformation, thereby reducing the dishing phenomenon, and yielding better WID uniformity.

In the present invention, it has been found that manufacturing a hybrid co-cured (or polymerized) polyether and polyester prepolymer in a certain weight percent proportion yields a polyurethane chemical mechanical polishing pad with the requisite balance of hardness, stiffness, and damping. The CMP pads manufactured from this hybrid co-polymer material provides good WIW and WID uniformity, smooth polishing, low dishing/or erosion, longer pad life, and improved removal rate.

Specifically, and based on the prescreened solid materials, several combinations of polyether to polyester weight percents were employed and tested. Based on the solid material screening, it was found that the polyether component provides high hardness, and hydrolytic stability, whereas the polyester component provides softer segments, and high damping. As a result, for the numerous materials cast, the weight percentage of polyester to polyether in the prepolymer mixture was modified. Otherwise, the manufacturing procedure outline above, can be employed to cast and harden a microcellular material/foam material, which naturally includes an effective amount of surfactant, curative and foaming agent. As shown in Table II, below, the ester content was increased from zero weight percent to 100 weight percent of the entire prepolymer mixture.

TABLE 2

| Ester (wt %) | Hardness | Rebound (%) | Pot Life (min.) | Elongation (%) | Notes |
| --- | --- | --- | --- | --- | --- |
| 0 | 72 | 44 | 4 | ~110 | 100% Polyether (Adiprene LF 750D) |
| 20 | 69 | 39 | 3.7 | ~160 | Polyether:Polyester = 4:1 |
| 25 | 68 | 36 | 3.5 | ~200 | Polyether:Polyester = 3:1 |
| 33.3 | 65 | 35 | 3.5 | ~220 | Polyether:Polyester = 2:1 |
| 50 | 64 | 33 | 3 | N/A | Polyether:Polyester = 1:1 |
| 100 | 60 | 31 | 2 | N/A | 100% Polyester (Versathane D6) |

Figure 2:
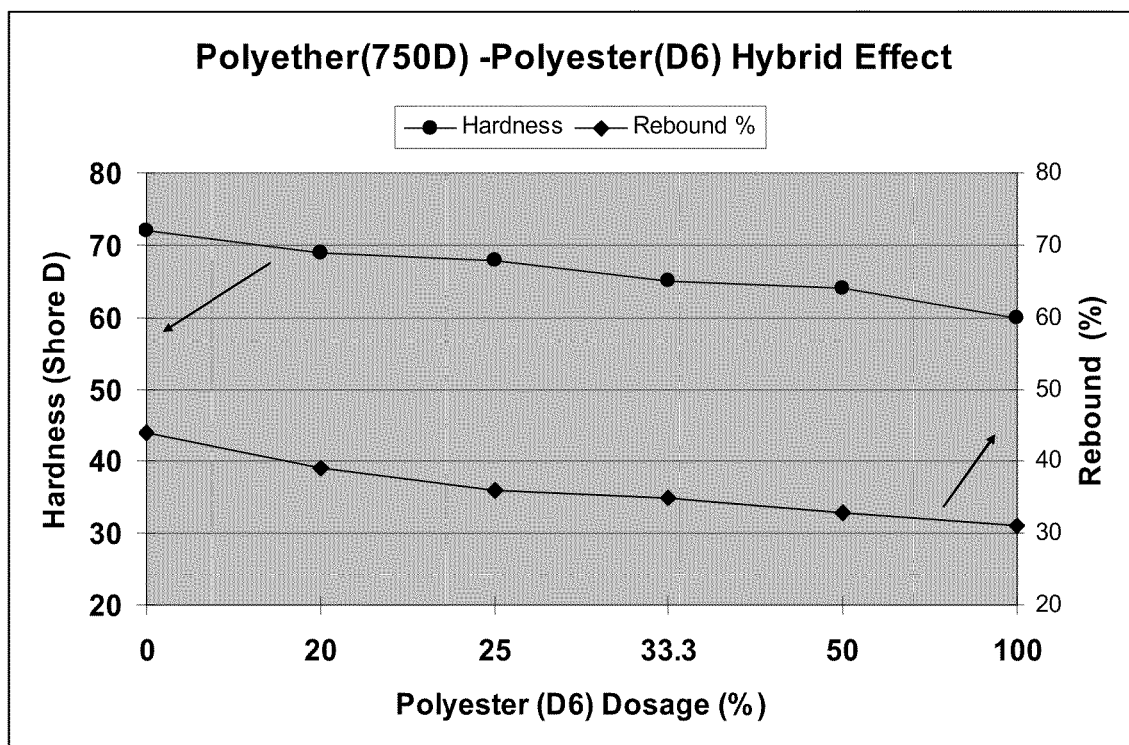
FIG. 2 depicts the ester dosage effect on the hybrid copolymer CMP copolymer solid formed based on a reaction mixture of polyether and polyester prepolymers.

Upon curing, the co-polymerimerized polyether/polyester reaction mixture is cut into coupons and tested. As shown, in Table 2, and graphically illustrated in FIG. 2, the addition and reaction mixture of about 20-40 wt % polyester prepolymer to about 60-80 wt % polyether prepolymer in a pad material with relatively high hardness and low rebound. Preferably, the co-polymerized blend is from a mixture of 65-75 wt % polyester prepolymer to 25-35 wt % polyether prepolymer, and most preferably about 70 wt % polyether to about 30 wt % polyester. As shown, the preferred balance of hardness (measured by Shore D) and low rebound (measured by the Bashore rebound) is arrived in the most preferred amounts of polyether to polyester prepolymers. While not wanting to be bound by any particular theory, it will be apparent to those skilled in the art, that the hardness of the pad material may be controlled by the density of the foaming agent, and the like. However, the rebound or damping of the pad is not affected by these factors.

Figure 3:
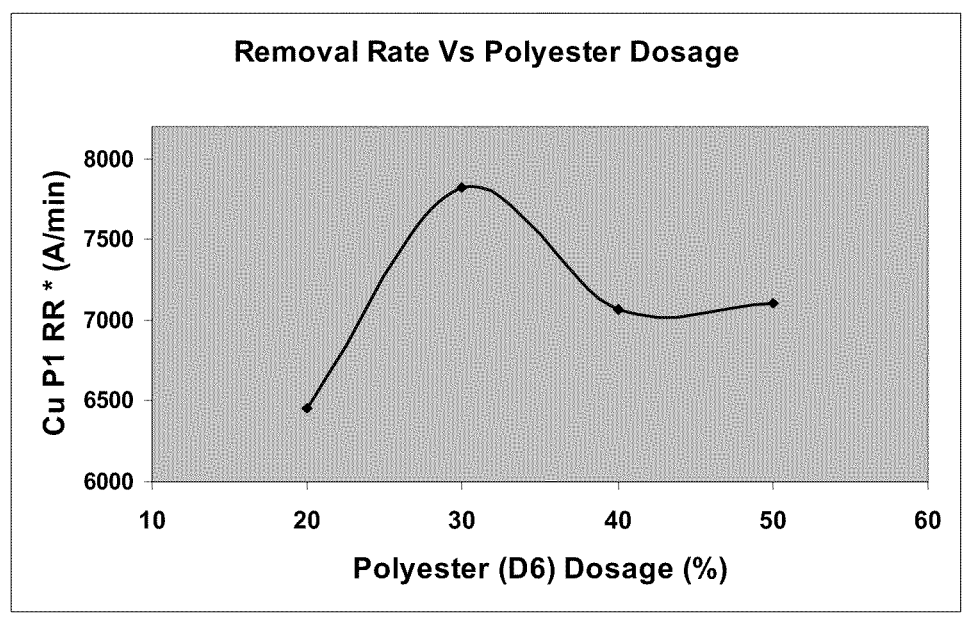
FIG. 3 illustrates the copper polishing performance of CMP pads in terms of removal rate for pad having various ester dosages.

The polyurethane CMP pads derived from a polyether/polyester prepolymer reaction mixture of the present invention were manufactured into 200 mm pads, and employed on a 200 mm tool manufactured by Applied Materials to test the rate of removal of a copper material from the surface of the substrate. These pads varied in the amount of ester prepolymer dosage vis-á-vis the ether prepolymer in accordance with the ranges prescribe above. The pads were employed in the removal of copper from a wafer substrate held onto a platen. As shown in FIG. 3, an ester dosage of about 30 wt % produced a pad with rate of removal of about 7,800 Å/min. Further, at an ester dosage of about 25 wt % to 35 wt %, the removal rate ranges from about 7,400 Å/min. to about 7,900 Å/min.

While the chemistry of the pad, manufacturing method and the performance of the inventive pad has been set forth, the following examples are intended to provide a basis for comparison of the present invention pads, with commercially available ones, but they are not to be construed as limiting the invention.

Comparative Example 1A

Sixty thousand (60,000) grams of TDI-polyether prepolymer manufactured by Chemtura Corporation and sold under the tradename Adiprene LF 750D was measured and added to a prepolymer process tank equipped with variable heating temperature and agitation speed. Three hundred (300) grams of silicone surfactant sold as Niax L-1800 by Momentives, Inc. was added to the process tank, and the mixture was agitated with a simple impeller to create a moderate vortex. The process tank is heated to 150° F. under an nitrogen atmosphere.

In a separate curative process tank, twenty thousand (20,000) grams of diamine curative manufactured by Albemarle corporation and marketed under the trademark Ethacure® 300 is supplied and heated to 130° F. under a nitrogen atmosphere. The mixed prepolymer and curative curative were simultaneous dispensed at flow rates of 566 g/min and 109 g/min, respectivelhy into the mixer head. Simultaneously nitrogen was injected at a flow rate of 0.6 cfh to the mixer head. The speed of the mixer was adjusted to around 5,000 rpm as was the back pressure to avoid cavitations and to allow smooth dispensing and expansion of the foam. The resultant microcellular foam had an approximately 0.7 specific gravity and a hardness of around 63 Shore D.

Comparative Example 2A

Sixty thousand (60,000) grams of TDI-polyether prepolyer manufactured by Chemtura Corporation and sold under the tradename Adiprene LF 750D was measured and added to a prepolymer process tank equipped with variable heating temperature and agitation speed. Twelve hundred (1,200) grams of silicone surfactant sold as Niax L-1800 by Momentives, Inc. was added to the process tank, and the mixture was agitated with a simple impeller to create a moderate vortex. The process tank is heated to 150° F. under an nitrogen atmosphere.

In a separate curative process tank, twenty thousand (20,000) grams of diamine curative manufactured by Albemarle corporation and marketed under the trademark Ethacure® 300 is supplied and heated to 130° F. under a nitrogen atmosphere.

The thoroughly mixed prepolymer and curative were simultaneous dispensed at flow rates of 566 g/min and 109 g/min, respectively into the mixer head. Simultaneously nitrogen was injected at a flow rate of 0.6 cfh to the mixer head. The speed of the mixer was adjusted to around 5,000 rpm as was the back pressure to avoid cavitations and to allow smooth dispensing and expansion of the foam. The resultant microcellular foam had an approximately 0.7 specific gravity and a hardness of around 60 Shore D.

Example 1

Sixty thousand (60,000) grams of total prepolymer was measure out. Of this, forty two thousand (42,000) grams of TDI-terminated polyether prepolyer manufactured by Chemtura Corporation and sold under the tradename Adiprene LF 750D was measured, and supplied to the processing tank equipped with variable heating temperature and agitation speed. Separately, (18,000) grams of TDI-terminated polyester prepolymer manufactured by Air Products and Chemicals, Inc. and sold under the name Versathane D-6 was measured and added to the processing tank containing the 42,000 grams of polyether prepolymer.

Twelve hundred (1,200) grams of silicone surfactant sold as Niax L-5340 by Momentives, Inc. was added to the process tank, and the mixture was agitated with a simple impeller to create a moderate vortex. The process tank is heated to 150° F. under an nitrogen atmosphere.

In a separate curative process tank, twenty thousand (20,000) grams of diamine curative manufactured by Albemarle corporation and marketed under the trademark Ethacure® 300 is supplied and heated to 130° F. under a nitrogen atmosphere.

The thoroughly mixed prepolymer and curative were simultaneous dispensed at flow rates of 566 g/min and 109 g/min, respectively into the mixer head. Simultaneously nitrogen was injected at a flow rate of 0.6 cfh to the mixer head. The speed of the mixer was adjusted to around 5,000 rpm as was the back pressure to avoid cavitations and to allow smooth dispensing and expansion of the foam. The resultant microcellular foam had an approximately 0.7 specific gravity and a hardness of around 57 Shore D.

Figure 4:
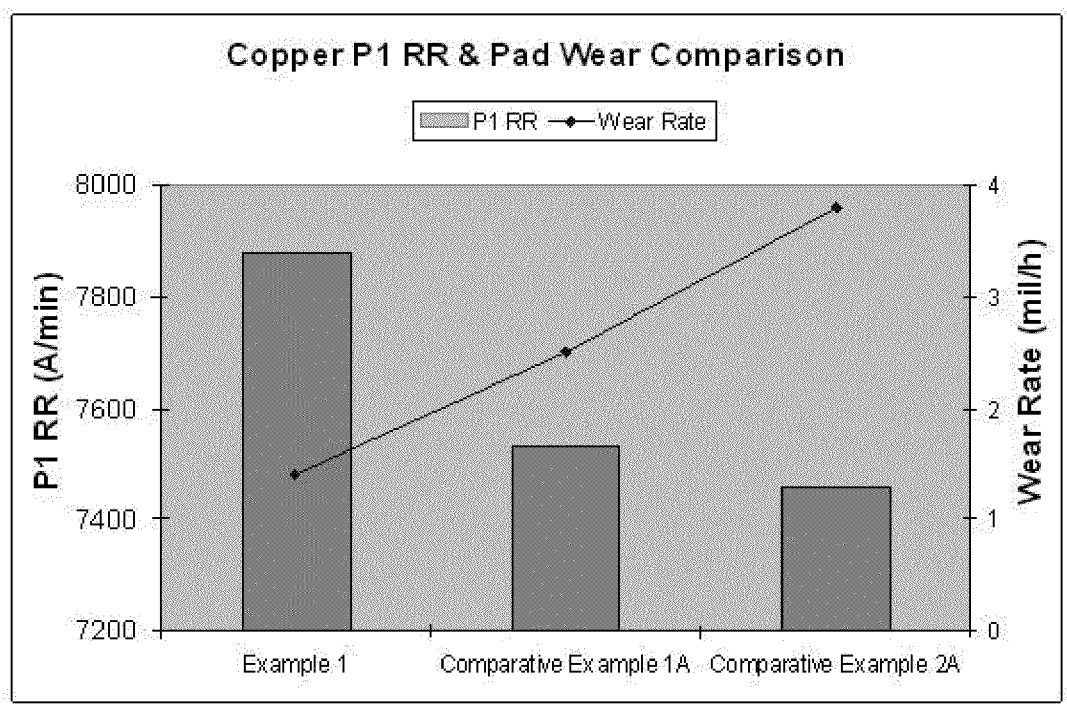
FIG. 4 illustrates a performance comparison between the CMP pad of the present invention and commercially available ones.

The CMP pads prepared as prescribed in the examples were employed in the copper removal from a substrate. As shown, in FIG. 4, the pad of the present invention (i.e., Example 1) exhibited a rate of removal of 7900 Å/min, and a lower wear rate of 1.4 mil/hr, than those of Comparative Examples 1A and 1B of average 7400 Å/min, and wear rate of 3.1 mil/hr respectively. Clearly the pads of the present invention, through its unique chemistry and physical properties attain an improved performance.

While this invention has been particularly shown and described with references to preferred embodiments thereof, it will be understood by those skilled in the art that various changes in form and details may be made therein without departing from the scope of the invention encompassed by the appended claims.

What is claimed is:

1. A polyurethane chemical mechanical polishing pad derived from a polyether/polyester based prepolymer reaction mixture, comprising:
   (a) toluene diisocyanate (TDI)-terminated polytetramethylene ether glycol based prepolymer in an amount of about 60-80 weight percent (wt %) based on the total weight of prepolymer mixture;
   (b) toluene diisocyanate (TDI)-terminated ethylene adipate polyester prepolymer in an amount of about 40-20 weight percent (wt %), wherein the weight percent based on the total weight of prepolymer mixture;
   (c) an effective amount of surfactant and curative, respectively, and
   (d) a foaming agent introduced into the reaction mixture to form said polishing pad, wherein the resulting polishing pad has a density ranging from about 0.6 to about 0.95 g/cc;
   wherein the curative is selected from the group consisting of 4,4'-methylene-bis-(3-chloro-2,6-diethylaniline), dimethylthiotoluenediamine, trimethyleneglycol di-p-aminobenzoate, polytetramethyleneoxide di-p-aminobenzoate, polytetramethyleneoxide mono-p-aminobenzoate, polypropyleneoxide di-p-aminobenzoate, polypropyleneoxide mono-p-aminobenzoate, 1,2-bis(2-aminophenylthio)ethane, 4,4'-methylene-bis-aniline, diethyltoluenediamine, 5-tert-butyl-2,4- and 3-tert-butyl-2,6-toluenediamine, 5-tert-amyl-2,4- and 3-tert-amyl-2,6-toluenediamine, chlorotoluenediamine, bis-(alkylthio) aromatic diamines, a mixture of 3,5-bis (methylthio)-2,6-toluenediamine and 3,5-bis(methylthio)-2,4-toluenediamine, a mixture of 3,5-diethyltoluene-2,4-diamine and 3,5-diethyltoluene-2,6-diamine and combinations thereof.

2. The polyurethane chemical mechanical polishing pad of claim 1, wherein the prepolymer reaction mixture is about 65-75 wt % TDI-terminated polytetramethylene ether glycol based prepolymer to about 25-35 wt % TDI-terminated ethylene adipate polyester prepolymer.

3. The polyurethane chemical mechanical polishing pad of claim 1, wherein the prepolymer reaction mixture is about 70 wt % TDI-terminated polytetramethylene ether glycol based prepolymer to about 30 wt % TDI-terminated ethylene adipate polyester prepolymer.

4. The polyurethane chemical mechanical polishing pad of claim 1, wherein the TDI-terminated ethylene adipate polyester has a molecular weight ranging from about 2500 to 4000 and is based on a reaction of an ethylene adipate polyol with a 1,3-diisocyanato methylbenzene.

5. The polyurethane chemical mechanical polishing pad of claim 1, wherein the average weight percent of unreacted isocyanate group (NCO) present in the prepolymer mixture ranges from about 6.5% to about 8.5%.

6. The polyurethane chemical mechanical polishing pad of claim 1, wherein the surfactant is selected from the group of silicone and polysiloxane-polyalkyleneoxide surfactants, in an amount from 0.3 to 5.0 wt % of prepolymers and surfactant.

7. The polyurethane chemical mechanical polishing pad of claim 1, wherein the effective amount of curative is in a ratio of 0.9 to 1.0 to the prepolymers utilized, wherein the ratio corresponds to a combination of amine and hydroxyl groups relative to an amount of available isocyanate groups.

8. The polyurethane chemical mechanical polishing pad of claim 1, wherein the pad has a Bashore rebound in the range of about 20% to about 50%.

9. The polyurethane chemical mechanical polishing pad of claim 1, wherein the pad has a removal rate of a metallic film from a wafer ranging from about 7,400 to about 7,900 Å/min.

10. A method of making a polyurethane chemical mechanical polishing pad derived from a polyether/polyester based prepolymer reaction mixture, comprising:
(a) mixing toluene diisocyanate (TDI)-terminated polyether prepolymer in an amount of about 60-80 weight percent (wt %) with toluene diisocyanate (TDI)-terminated polyester prepolymer in an amount of about 40-20 weight percent (wt %), in the presence of an effective amount of surfactant, wherein the weight percent is based on the total weight of the prepolymers;
(b) frothing the reaction mixture of step (a) by introducing a foaming agent into the reaction mixture; and
(c) polymerizing the frothed reaction mixture in the presence of an effective amount of curative to form a polishing pad having a density ranging from about 0.6 to about 0.95 g/cc, wherein the curative is selected from the group consisting of 4,4'-methylene-bis-(3-chloro-2,6-diethylaniline), dimethylthiotoluenediamine, trimethyleneglycol di-p-aminobenzoate, polytetramethyleneoxide di-p-aminobenzoate, polytetramethyleneoxide mono-p-aminobenzoate, polypropyleneoxide di-p-aminobenzoate, polypropyleneoxide mono-p-aminobenzoate, 1,2-bis(2-aminophenylthio)ethane, 4,4'-methylene-bis-aniline, diethyltoluenediamine, 5-tert-butyl-2, 4- and 3-tert-butyl-2,6-toluenediamine, 5-tert-amyl-2, 4- and 3-tert-amyl-2,6-toluenediamine, chlorotoluenediamine, bis-(alkylthio) aromatic diamines, a mixture of 3,5-bis(methylthio)-2,6-toluenediamine and 3,5-bis(methylthio)-2,4-toluenediamine, a mixture of 3,5-diethyltoluene-2,4-diamine and 3,5-diethyltoluene-2,6-diamine and combinations thereof.

11. The method of making a polyurethane chemical mechanical polishing pad of claim 10, wherein the prepolymer reaction mixture is about 65-75 wt % TDI-terminated polytetramethylene ether glycol based prepolymer to about 25-35 wt % TDI-terminated ethylene adipate polyester prepolymer.

12. The method of making a polyurethane chemical mechanical polishing pad of claim 10, wherein the prepolymer reaction mixture is about 70 wt % TDI-terminated polytetramethylene ether glycol based prepolymer to about 30 wt % TDI-terminated ethylene adipate polyester prepolymer.

13. The method of making a polyurethane chemical mechanical polishing pad of claim 10, wherein the TDI-terminated polytetramethylene ether glycol based and TDI-terminated ethylene adipate polyester prepolymers are first mixed with the surfactant in a tank and the foaming agent is added to said tank to form a froth.

14. The method of making a polyurethane chemical mechanical polishing pad of claim 13, wherein the froth is routed to a mixer tank and the curative is added to said mixer tank.

15. The method of making a polyurethane chemical mechanical polishing pad of claim 14, wherein a green cured polyurethane foam is dispensed from said mixer tank and further cured.

16. The method of making a polyurethane chemical mechanical polishing pad of claim 10, wherein the prepolymers, surfactant, and foaming, agent are provided in the same tank, and the curative agent is added thereafter to the same tank.

17. The method of making a polyurethane chemical mechanical polishing pad of claim 10, wherein the TDI-terminated polyester is an ethylene adipate polyester having a molecular weight ranging from about 2000 to 4000 and is based on a reaction of an ethylene adipate polydiol with a 1,3-diisocyanato methylbenzene.

18. The method of making a polyurethane chemical mechanical polishing pad of claim 13, wherein the average weight percent of unreacted isocyanate group (NCO) present in the prepolymer mixture ranges from about 6.5% to about 8.5%.

19. The method of making a polyurethane chemical mechanical polishing pad of claim 10, wherein the surfactant is selected from the group of silicone and polysiloxane-polyalkyleneoxide surfactants, in an amount from 0.3 to 5.0 wt % of prepolymers and surfactant.

20. The method of making a polyurethane chemical mechanical polishing pad of claim 10, wherein the effective amount of curative is in a ratio of 0.9 to 1.0 to the prepolymers utilized, wherein the ratio corresponds to a combination of amine and hydroxyl groups relative to an amount of available isocyanate groups.

21. A polyurethane chemical mechanical polishing pad polishing pad produced by the method of claim 10.

* * * * *